United States Patent [19]
Reuteman et al.

[11] Patent Number: 4,484,694

[45] Date of Patent: Nov. 27, 1984

[54] ICE CREAM CONE DISPENSER

[75] Inventors: Harry J. Reuteman; Howard B. Lampley; Dale E. McElroy, all of Cincinnati, Ohio

[73] Assignee: Slush Puppie Corporation, Cincinnati, Ohio

[21] Appl. No.: 398,345

[22] Filed: Jul. 15, 1982

[51] Int. Cl.[3] .............................................. B65G 59/10

[52] U.S. Cl. .................................... 221/197; 221/310

[58] Field of Search ............... 221/307, 308, 310, 285, 221/197, 92; 312/43; 229/43

[56] References Cited

U.S. PATENT DOCUMENTS 2,232,425 2/1941 Balton ............................ 221/307 X 2,323,841 7/1943 Pape et al. ........................ 312/43 X 3,118,565 1/1964 Chappory ....................... 222/197 X 4,090,637 5/1978 Williamson ..................... 221/310 X

*Primary Examiner*—Stanley H. Tollberg

*Attorney, Agent, or Firm*—Frost & Jacobs

[57] ABSTRACT

An ice cream cone dispenser for dispensing cones from a carton thereof containing columns of nested cones. The dispenser comprises a stand support of L-shaped configuration having a horizontal portion and a vertical portion. A rectangular stand chamber, open at its top and bottom, is removably mounted at the upper end of the vertical portion of the stand support, overlying the horizontal stand support portion. A removable crumb tray is mounted on the stand support horizontal portion beneath the stand chamber. A rectangular carton adapter, open at its top and bottom, is so sized as to be mountable within the stand chamber and to just nicely receive and support the open bottom end of a cone carton. The carton adapter, at its open bottom end, supports a horizontal dispensing baffle. The dispensing baffle has a cutout therein for each column of nested cones in the cone carton. Each cutout has a series of resilient fingers which engage the bottommost cone of its respective column permitting it to extend partway through the cutout and to be pulled through the cutout while retaining the rest of the column in place. The bottom end of the stand chamber may be provided with a hinged closure.

15 Claims, 11 Drawing Figures

ICE CREAM CONE DISPENSER

TECHNICAL FIELD

The invention relates to an ice cream cone dispenser, and more particularly to such a dispenser capable of dispensing cones of different sizes and types, without damage to the cones.

BACKGROUND ART

Ice cream cones are available in several varieties. Most common are the cup-type and the conical type. These types of cones, in turn, are available in various sizes.

Prior art workers have devised a variety of different cone dispensers. The most frequently encountered cone dispensers comprise support means for an elongated carton containing columns of nested cones. The columns of cones are retained in the carton, until dispensed, by spring means. Such dispensers, however, are characterized by a number of deficiencies. They are generally unattractive and somewhat flimsy. During the dispensing procedure, the relatively delicate cones are often broken. Finally, most such dispensers are designed to dispense cones of one size only, it being necessary to have a separate dispenser for each cone size.

The present invention is based upon the discovery that if the cones are dispensed through a baffle having cutouts therein with resilient fingers to retain the cones until dispensed, cone breakage can be substantially reduced or eliminated. Furthermore, if such a dispensing baffle is mounted on a carton adapter (intended to receive and support the dispensing end of the cone carton), and if the carton adapter and dispensing baffle are separate elements mountable in the dispensing stand, then a given dispenser can be provided with several sizes of carton adapters and dispensing baffles to render it capable of dispensing various sizes of cones.

The dispenser of the present invention is both sturdy and attractive. The dispensing baffles can be readily replaced if their cone engaging fingers become worn or lose their appropriate resiliency. The dispenser can be easily assembled and disassembled for cleaning and the like. By virtue of the provision of an adapter and dispensing baffle, the dispenser is easier to load than most prior art structures.

DISCLOSURE OF THE INVENTION

According to the invention, there is provided an ice cream cone dispenser for dispensing cones from a carton thereof containing columns of nested cones. The dispenser comprises a stand support of L-shaped configuration having a horizontal portion and a vertical portion. The horizontal portion may rest upon a countertop, shelf or other horizontal surface. Alternatively, the vertical portion of the stand may be affixed to a vertical surface such as a wall, partition or the like. The horizontal portion of the stand support carries a removable crumb tray.

A rectangular stand chamber, open at its top and bottom, is removably mounted at the upper end of the vertical portion of the stand support. The stand chamber overlies the horizontal stand support portion and the crumb tray.

A rectangular carton adapter, open at its top and bottom, is so sized as to be mountable within the stand chamber. The carton adapter is further sized so as to just nicely receive and support the opened bottom dispensing end of a cone carton.

The carton adapter, at its opened bottom end, removably supports a horizontal dispensing baffle. The dispensing baffle is a substantially planar member having a cutout therein for each column of nested cones in the cone carton. Each cutout has a series of radial resilient fingers which engage the bottommost cone of its respective column thereof, permitting it to extend partway through the cutout, the resilient fingers supporting their respective column of cones. During a dispensing procedure, the bottommost cone of the column, extending partway through the cutout, can be pulled through the cutout past the resilient fingers. The resilient fingers retain the rest of the column of cones in place, the next bottommost cone extending partway through the cutout in position to be dispensed. The bottom end of the stand chamber may be provided with a hinged closure or lid to protect the cones when the dispenser is not in use.

DETAILED DESCRIPTION OF THE INVENTION

Figure 1:
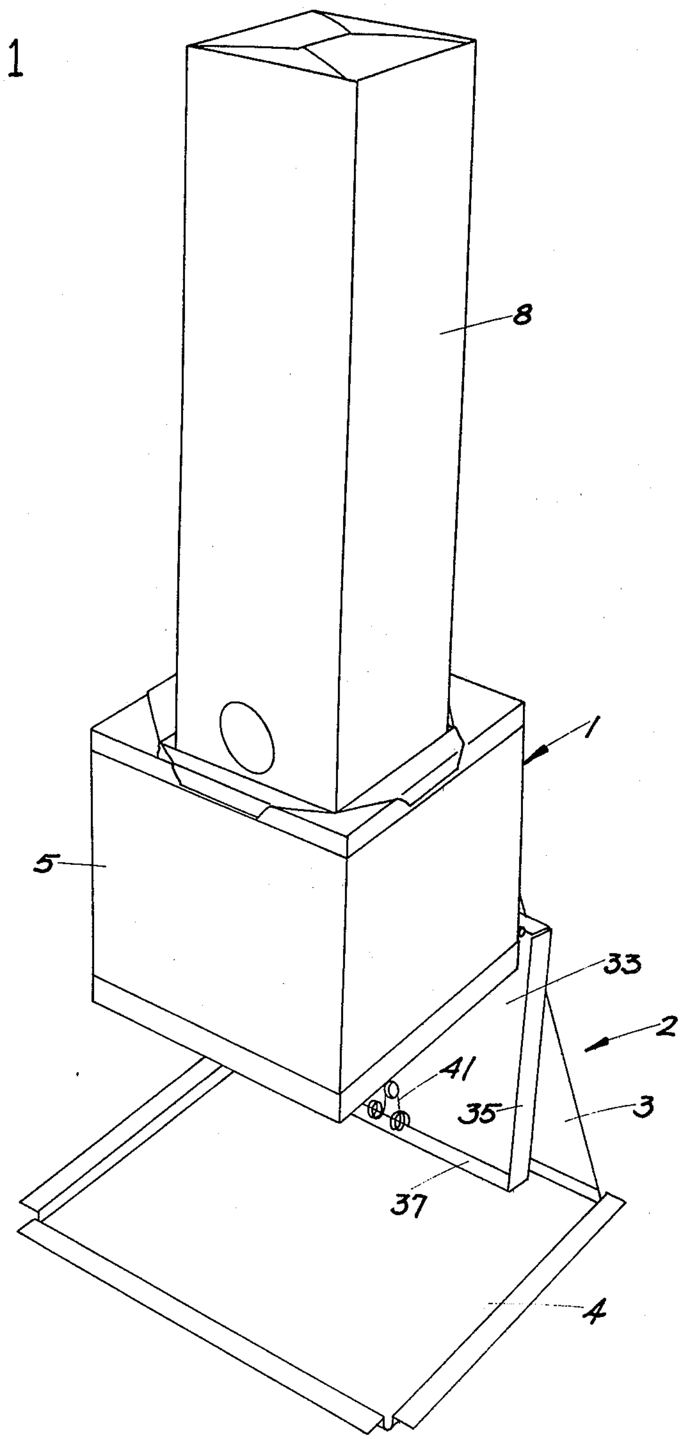
FIG. 1 is a perspective view of the fully assembled and loaded ice cream cone dispenser of the present invention.
Figure 2:
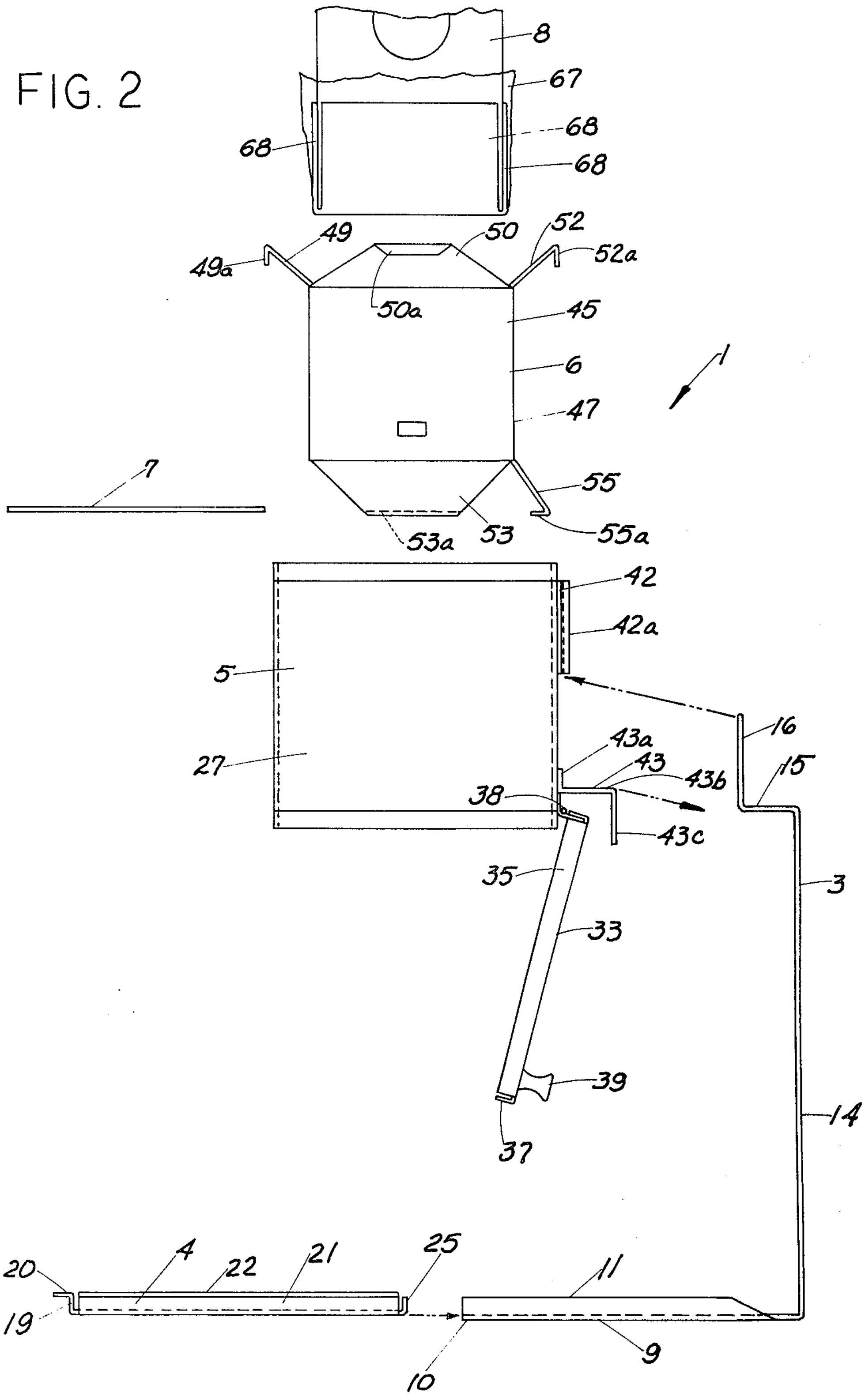
FIG. 2 is an exploded, side elevational view of the dispenser of FIG. 1.

Reference is first made to FIGS. 1 and 2. All of the basic parts of the ice cream cone dispenser of the present invention are illustrated in one or both of these Figures. The dispenser is generally indicated at 1. The dispenser comprises a stand, generally indicated at 2 in FIG. 1 and comprising a stand support 3 with a crumb tray 4 and a stand chamber 5. The stand chamber 5 is configured to receive a carton adapter 6 and a cone dispensing baffle 7 (see FIG. 2). The carton adapter 6 is mounted in the stand chamber 5 and, in turn, mounts the cone dispensing baffle 7 and a carton 8 of cones.

While the stand support 3, crumb tray 4, stand chamber 5 and carton adapter 6 may be made of any appropriate material of sufficient strength and capable of adequate cleaning, these parts lend themselves well to being fabricated of sheet metal, and are so illustrated in the Figures.

Figure 3:
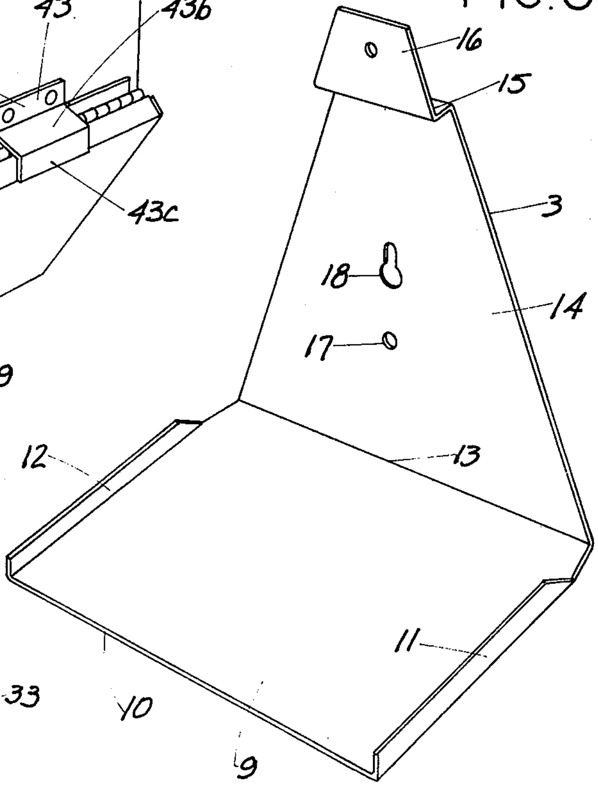
FIG. 3 is a perspective view of the dispenser stand support.

Turning to FIG. 3, the cone stand support comprises a substantially L-shaped structure having a horizontal portion 9 which may be placed upon a suitable support surface, such as a counter top, shelf or the like. The horizontal portion 9 has a forward edge 10. The side edges of horizontal portion 9 may be provided with upturned flanges 11 and 12, the purpose of which will be described hereinafter. The rearward edge 13 of horizontal portion 9 terminates in a first, upstanding, tapered portion 14, the side edges of which slope upwardly and inwardly. The portion 14, at its upper end, terminates in a horizontal forwardly extending portion 15, which, in turn, terminates in a vertical portion 16. The portions 15 and 16 constitute continuations of the portion 14 and continue the taper as well. The portion 16 is parallel to the portion 14 and is inset forwardly thereof by the portion 15, for reasons which will be evident hereinafter.

The stand support 3 constitutes the base of the ice cream cone dispenser. While, as indicated above, the portion 9 may be rested on a suitable horizontal surface such as a counter top, shelf or the like, it is within the scope of the present invention to mount the cone stand on a vertical surface such as a wall or partition. To this end, the stand support vertical portion 14 may be provided with one or more perforations 17 or 18, by means of which it may be affixed to a vertical surface by appropriate fastening means such as screws, bolts or the like. For easy removal from a vertical surface, the perforations may be of the keyhole type, as shown at 18 in FIG. 3.

Figure 4:
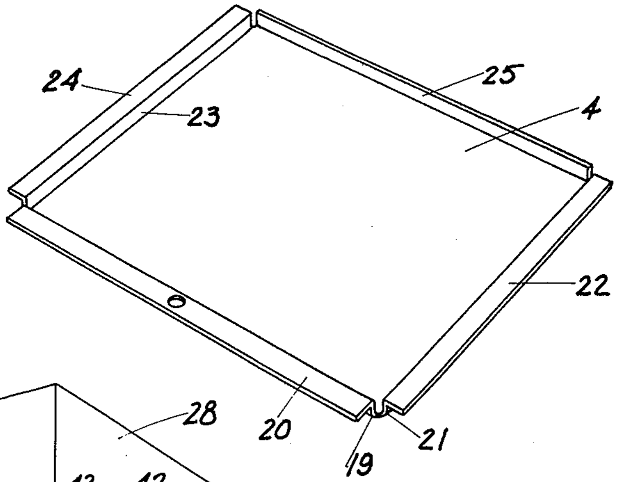
FIG. 4 is a perspective view of the dispenser stand crumb tray.

FIG. 4 illustrates the crumb tray 4 of the ice cream cone dispenser. The crumb tray 4 is intended to catch and retain crumbs from the dispensed cones. The crumb tray 4 comprises a planar member having an integral flange formed along its forward edge. The forward flange comprises an upstanding portion 19, terminating in a horizontal forwardly extending portion 20. One side of crumb tray 4 is provided with a similar integral flange having an upstanding portion 21 and a laterally extending horizontal portion 22. The other side of the crumb tray is provided with a substantially identical integral flange, having an upstanding portion 23 and a laterally extending horizontal portion 24. The rear edge of the crumb tray is also provided with an integral flange. This flange, however, has only an upstanding portion 25. The crumb tray 4 is removably mounted on the horizontal portion 9 of stand support 3 with its rear flange 25 abutting the upstanding portion 14 of the stand support. The upstanding portions 21 and 23 of the crumb tray side flanges lie inside the upturned flanges 11 and 12 of the stand support horizontal portion 9, with their horizontal portions 22 and 24 overlying stand support flanges 11 and 12, respectively. It will be apparent that an accumulation of crumbs can be removed from the dispenser simply by removing and cleaning crumb tray 4.

Figure 5:
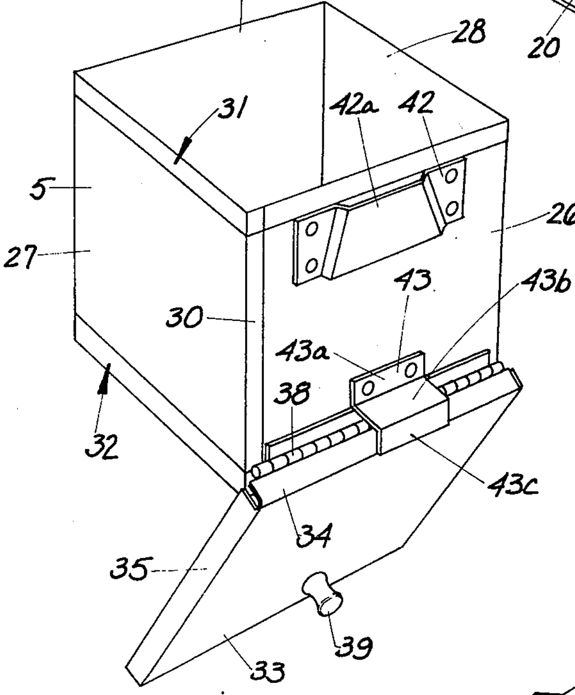
FIG. 5 is a perspective view of the dispenser stand chamber.

The stand chamber of the cone dispenser is illustrated in FIG. 5. The stand chamber 5 comprises a sheet metal member so folded as to form a rectangular structure having vertical walls. In FIG. 5, the rear wall is shown at 26, the side walls are shown at 27 and 28, and the front wall is illustrated at 29. Side wall 27 terminates in a flap portion 30 which is welded or otherwise appropriately affixed to the adjacent edge portion of rear wall 26 to complete the structure. The upper and lower edges of the structure are folded over, as is generally indicated at 31 and 32 to strengthen and rigidify the structure. It will be understood that the stand chamber 5 is open at its top and bottom.

Figure 6:
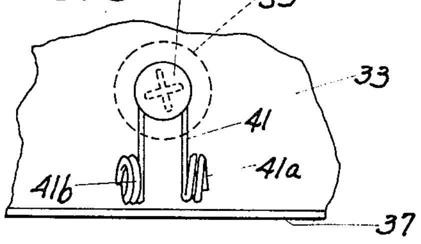
FIG. 6 is a fragmentary plan view of the dispenser stand chamber lid, illustrating the spring latch thereof.

A closure or lid 33 is provided for the open bottom of stand chamber 5. The lid 33 comprises a planar element having upturned rear, side and front edges 34, 35, 36 and 37, respectively. An elongated hinge 38 is provided, one portion of which is welded or otherwise appropriately affixed to the inside surface of the upturned rear edge 34 of lid 33. The other portion of the hinge is welded or otherwise appropriately affixed to the rear wall 26 of stand chamber 5. The lid 33 is swingable between a downwardly depending open position and a substantially horizontal closed position. To assist in shifting lid 33 between its open and closed positions, a handle 39 is affixed to the lid near its forward edge by a screw 40 (see FIG. 6). The screw 40 also mounts a spring latch to maintain the lid in its closed position. The spring latch comprises a U-shaped spring 41, the base of which is located beneath the head of screw 40. The legs of U-shaped spring 41 terminate in vertical coils **41*a* and 41*b*. The coils 41*a* and 41*b* are spaced from the upturned front edge 37 of lid 33 by a distance less than the thickness of the lower edge portion of front wall 29 of stand chamber 5. Thus, when lid 33 is in its closed position, the lower edge of stand chamber front wall 29 will be frictionally engaged between the front edge 37 of lid 33 and the coiled portions 41*a* and 41*b* of spring 41**.

A strap-like bracket 42 is appropriately affixed, as by welding or the like, to rear wall 26 of stand chamber 5. The bracket 42 has a central portion **42*a* spaced from rear wall 26 and configured to form a tapered pocket to just nicely receive portion 16 of stand support 3. In this way, the stand chamber 5 is removably mounted on stand support 3**.

A second bracket 43 is welded or otherwise appropriately affixed to rear wall 26 of stand chamber 5, just above hinge 38. Bracket 43 has a first vertical portion **43*a* affixed to rear wall 26, a second horizontal portion 43*b* extending rearwardly of rear wall 26, and a downwardly depending portion 43*c*. As is most clearly shown in FIG. 11, the bracket 43 serves as a spacer between stand chamber 5 and stand support 3, the bracket portion 43*c* abutting the front surface of stand support portion 14. Thus, bracket 43 steadies stand chamber 5** and maintains its front end rear walls substantially vertical.

Figure 7:
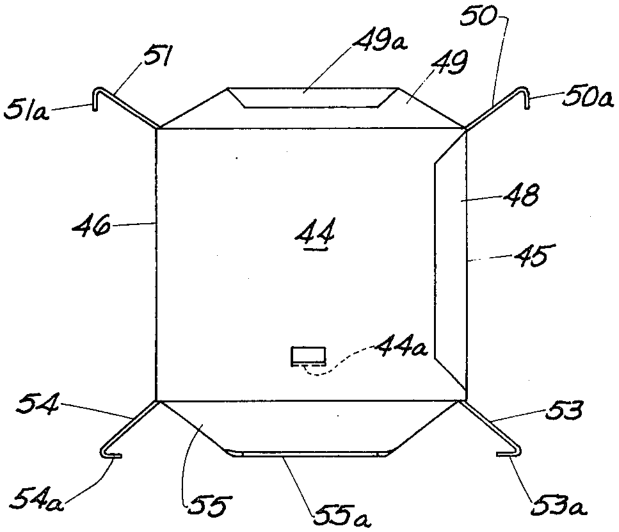
FIGS. 7, 8 and 9 are respectively a side view, a plan view and a bottom view of the carton adapter.
Figure 9:
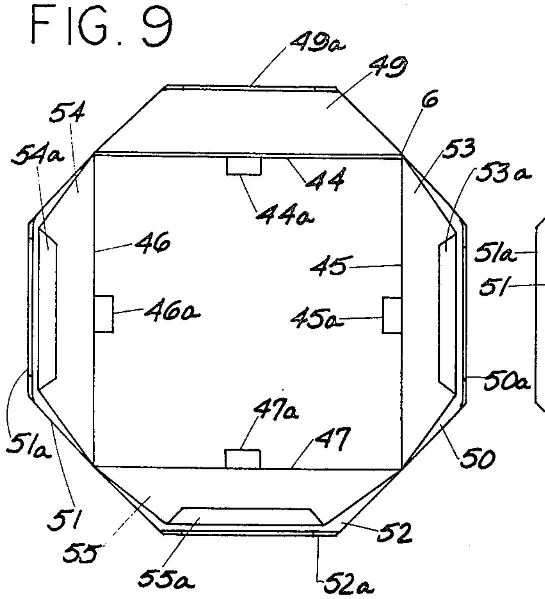
Figure 8:
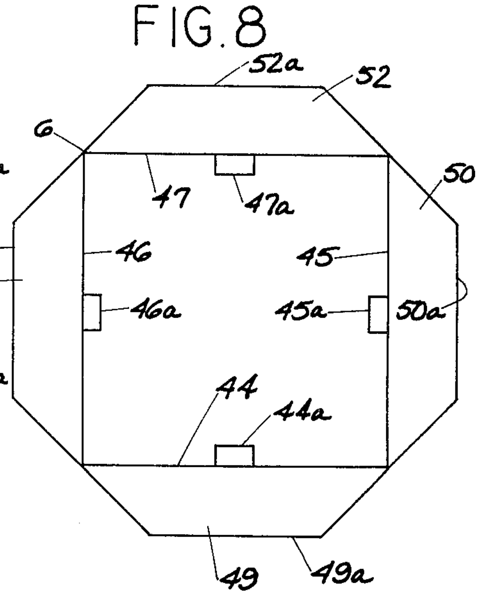

FIGS. 7, 8 and 9 illustrate the carton adapter 6. Carton adapter 6 again comprises a sheet metal member so folded as to form a rectangular element having a front wall 44, side walls 45 and 46 and a rear wall 47. Side wall 45 terminates in a flange 48 formed at right angles thereto and overlying the free edge of front wall 44. The flange 48 is welded or otherwise appropriately secured to the free edge portion of front wall 44.

Figure 11:
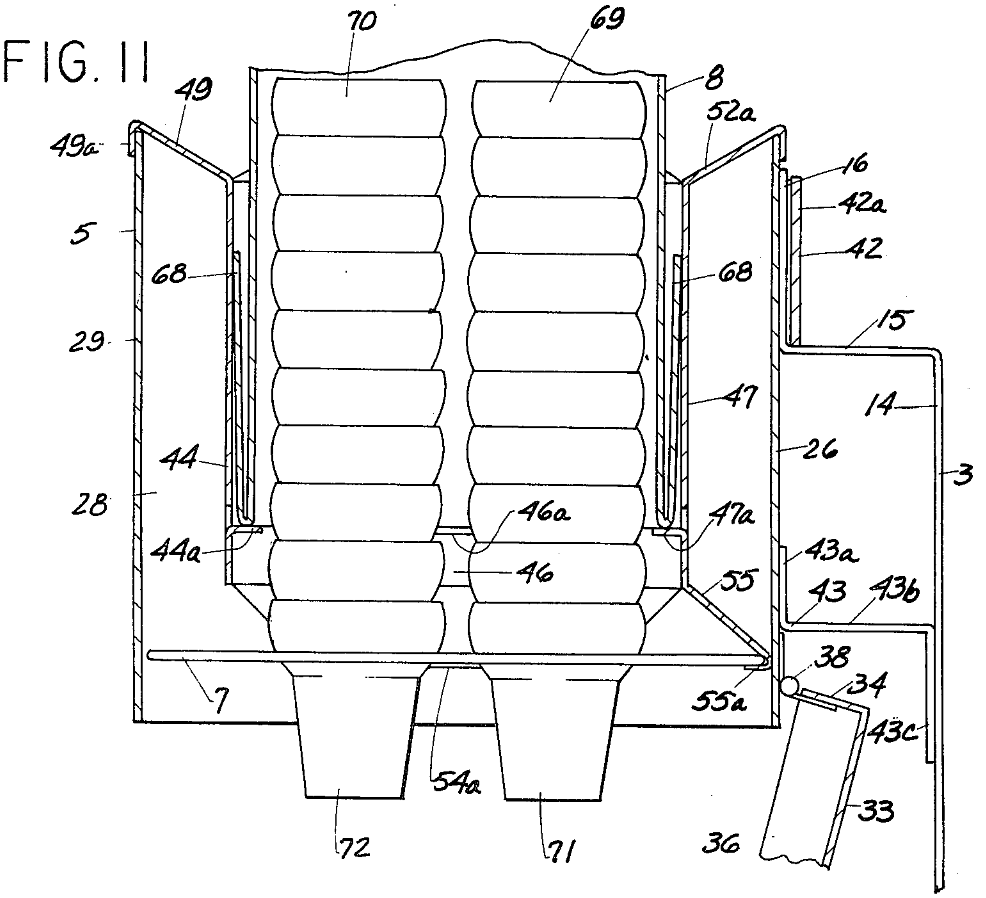
FIG. 11 is a fragmentary cross sectional view illustrating the assembly of the dispenser stand support, the cone stand chamber, the carton adapter, the cone dispensing baffle and a carton of cones.

At its upper edge, front wall 44 has an integral upwardly and outwardly extending flange 49, the sides of which taper upwardly and inwardly, the flange 49 terminates in a downwardly depending portion **49*a*. Side walls 45 and 46 and rear wall 47 are provided with similar flanges 50, 51 and 52, respectively, terminating in downwardly depending flange portions 50*a*, 51*a* and 52*a*. The flanges 49 through 52 and their downwardly depending flange portions 49*a* through 52*a* are so sized and configured as to engage and hook upon the upper edges of the walls of stand chamber 5 when the carton adapter is located therein, so as to suspend the carton adapter within stand chamber 5, as is illustrated in FIG. 11. In this Figure, carton adapter front wall flange 49 and its downwardly depending portion 49*a* are shown engaging the upper edge of stand chamber front wall 29, while carton adapter rear wall flange 52 and its downwardly depending portion 52*a* engage the upper edge of stand chamber rear wall 26. It will be understood that the side wall flanges 50 and 51 and their flange portions 50***a* and 51*a* will engage side walls 27 and 28 of stand chamber 5 in an identical manner. The orientation of carton adapter 6 within stand chamber 5 is of no consequence and any of the carton adapter flanges 49 through 52 and their downwardly depending flange portions 49*a* through 52*a* can engage the upper edges of any of the walls 26 through 29 of stand chamber 5.

Each of the carton adapter walls 44 through 47 has, near its lower edge, a tab formed therefrom and bent inwardly thereof so as to extend substantially horizontally within carton adapter 6. These tabs are indicated in FIGS. 7 through 9 at 44*a* through 47*a*. These are carton supporting tabs, as will be evident hereinafter.

To complete the structure of the carton adapter 6, the lower edge of side wall 45 is provided with an integral flange 53 having tapered sides and extending downwardly and outwardly, as is most clearly shown in FIG. 7. The flange 53 terminates in an inturned flange portion 53*a* which is substantially horizontal. Side wall 46 and rear wall 47 are provided with substantially identical integral flanges 54 and 55, respectively. The flanges 54 and 55 terminate in inturned flange portions 54*a* and 55*a* which are again substantially horizontal and which are substantially coplanar with inturned flange portion 53*a*. The lower edge of front wall 44 is not provided with a flange. The downwardly and outwardly extending flanges 53, 54 and 55 (having horizontal flange portions 53*a*, 54*a* and 55*a*) are intended to engage and support cone dispensing baffle 7, next to be described.

Figure 10:
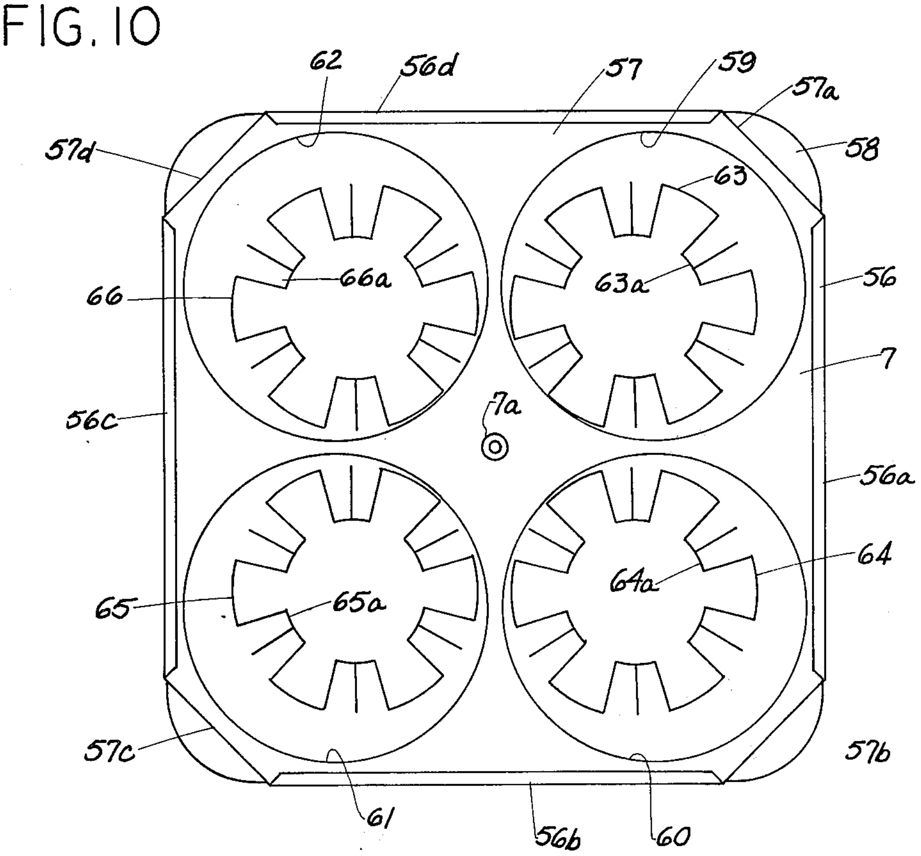
FIG. 10 is a bottom view of the cone dispensing baffle.

The cone dispensing baffle 7 is illustrated in FIG. 10. The baffle is made up of two substantially identical planar metallic members 56 and 57 with a rectangular piece of resilient material 58 located therebetween. The resilient material 58 may be either plastic, rubber or the like. Metallic member 57 is a planar rectangular member having its corners relieved as at 57*a* through 57*d*. Metallic member 57 is also provided with four evenly spaced circular perforations 59 through 62. These perforations are of a greater diameter than the cones to be dispensed therethrough.

Metallic member 56, as indicated above, is substantially identical to metallic member 57, having relieved corners (not shown) and identical corresponding circular perforations (again not shown). The metallic plate-like member 56 differs from the metallic member 57 only in that its peripheral dimensions are slightly greater so that, when the cone dispensing baffle is assembled with the resilient member 58 located between metallic members 56 and 57, edge portions 56*a* through 56*d* of metallic member 56 can be crimped over corresponding edge portions of metallic member 57, as shown in FIG. 10. A perforation is provided at the center of metal members 56 and 57 and resilient member 58, adapted to receive a rivet 7*a* or other appropriate fastening means to additionally hold the assembly together.

The planar resilient member 58 is substantially rectangular, with slightly rounded corners. It will be noted in FIG. 10 that the rounded corners of resilient member 58 extend beyond the relieved corners of metallic members 56 and 57.

That portion of resilient member 58 exposed by perforation 59 in metallic member 57 and the corresponding perforation (not shown) in metallic member 56 is provided with a circular cutout 63 of a dimension sufficient to permit a cone to pass therethrough. The circular cutout 63 has a plurality of evenly spaced, integral, radially inwardly extending fingers 63*a* which, as will be described hereinafter, will retain a cone until physically pulled therethrough. The remaining portions of resilient member 58 exposed by perforations 60, 61 and 62 of metallic member 57 and the corresponding perforations of metallic member 56 are provided with identical circular cutouts 64 through 66, each provided with evenly spaced, radially inwardly extending fingers 64*a* through 66*a*, respectively.

Excellent results have been achieved with dispensing baffles wherein the metallic members were made of 0.015 inch anodized aluminum and the resilient member 58 was made of white, food grade, washable rubber having a good memory factor, a thickness of about 1/16 inch and a durometer of from about 55 to about 65 and preferably about 60. Such material is, for example, commonly sold under the mark "Neopreme".

The cone dispensing baffle 7 is adapted to be mounted on and retained by the lower flanges 53, 54 and 55 and their horizontal flange portions 53*a*, 54*a* and 55*a* of the carton adapter 6, as shown in FIG. 11. The cone dispensing baffle 7 can be slipped into and out of engagement of these flanges from the front wall of the carton adapter which does not have such a flange.

The cone dispenser having been described in detail, the manner of its use can be set forth as follows. The stand support 3 is mounted either on a horizontal surface or a vertical surface. The stand chamber 5 is then mounted on the stand support 3 by insertion of stand support portion 16 into pocket 42*a* on the rear wall of stand chamber 5.

The usual carton of cones comprises an elongated carton of substantially square or rectangular configuration containing four columns of nested cones. Such a carton is illustrated at 8 in FIGS. 1 and 2. The carton may be provided with a plastic inner wrap or liner 67 and frequently is provided with an elongated cardboard baffle (not shown) of X-shaped cross section separating the columns of cones.

In the operation of the present invention, the cone carton 8 is inverted and its bottom end is opened. The flaps 68 of the bottom end of the carton are folded down along its sides and the inner liner 67 is folded over the flaps 68. With the carton inverted and its bottom open in the manner just described, the carton adapter 6 is also inverted and placed over the bottom end of the carton. The inside dimensions of the carton adapter 6 are such as to just nicely receive the bottom end of the carton, which extends into the carton adapter until it abuts inturned tabs or stops 44*a* through 47*a*. If not already mounted therein, the cone dispensing baffle 7 may now be mounted in carton adapter 6. This entire assembly is then turned upright and the carton adapter 6 is mounted in the stand chamber 5 as described above. This is shown in FIG. 11.

When the assembly of carton 8 and carton adapter 6 are turned upright, the columns of cones in the carton will shift downwardly until the bottommost cone of each column extends partway through the cutouts 63 through 66 of the resilient member 58 of cone dispensing baffle 7. Two columns of cones are shown at 69 and 70 in FIG. 11. It will be noted that the bottommost cone 71 of column 69 and the bottommost cone 72 of column 70 extend partway through cone dispensing baffle 7. It will be understood that the bottommost cones of the cone columns (not shown) will do the same. It will further be understood that the cone columns will be maintained in the positions shown in FIG. 11 by virtue of the resilient fingers 63*a* through 66*a* of the cone dispensing baffle 7. When it is desired to remove the bottommost cone from any one of the cone columns, it is only necessary for the operator to grasp the bottommost cone and pull it downwardly through the resilient fingers of its associated cutout. In this way, the bottommost cone of the column will be released and the remainder of the column will be retained by the resilient fingers of cone dispensing baffle 7.

In the embodiment illustrated in FIG. 11, the cones of columns 69 and 70 are illustrated as being of the well known cup type. It will be understood by one skilled in the art that the conventional conical cones will operate in the same manner. When the dispenser is not to be used for a while (such as overnight or the like), the freshness and cleanliness of the cones can be preserved by simply shifting lid 33 to its closed position. The carton adapter 6 is so sized with respect to carton 8 that the carton flaps 68 and its inner liner 67 will substantially form a seal with the walls of the carton adapter, again protecting the cleanliness and freshness of the cones. When all of the cones of carton 8 have been dispensed, the carton 8 and the carton adapter 6 can be removed from the dispenser and a new carton substituted for the old carton in the manner described above.

The stand chamber 5 may be so dimensioned as to accommodate several sizes of carton adapters and cone dispensing baffles, so that cones of more than one size can be used in the dispenser. When carton adapters and dispensing baffles of various sizes are provided with the dispenser, it will be understood that they will be substantially identical to carton adapter 6 and cone dispensing baffle 7 described above, differing only in dimensions so as to be able to accommodate cartons and cones of different sizes.

It will be evident to one skilled in the art that the ice cream cone dispenser of the present invention can be readily dismantled into its individual parts for purposes of cleaning and the like.

Modifications may be made in the invention without departing from the spirit of it.

What is claimed is:

1. An ice cream cone dispenser for dispensing cones from a carton thereof of the type containing columns of nested cones and having an openable bottom end, said dispenser comprising a chamber having a front wall, side walls and a rear wall with an open top and an open bottom, means to support said chamber with said front, side and rear walls substantially vertical and with access to said bottom thereof, a carton adapter comprising a rectangular four-walled element receivable within said chamber and having an open top and an open bottom, means to support said carton adapter within said chamber comprising a hook-shaped flange at the upper edge of each of said four walls of said carton adapter extending upwardly and outwardly therefrom, each of said flanges being so sized and configured as to have a hook-like engagement with the upper edge of one of said chamber walls when said carton adapter is located within said chamber to suspend said carton adapter within said chamber, said carton adapter being so dimensioned as to receive said bottom end of said cone carton in opened condition, means within said carton adapter to support said opened bottom end of said cone carton, a cone dispensing baffle comprising a substantially planar member having cutouts therein equal in number to said columns of cones in said cone carton, said cutouts being so sized as to permit a cone to pass therethrough, a series of inwardly extending resilient fingers in association with each cutout to support its respective column of cones thereabove with the bottommost cone of said column extending partway through said cutout, said fingers being distortable so that the bottommost cone can be dispensed by being pulled through said cutout past said fingers, the remainder of said column being retained by said fingers, and means on said carton adapter to support said dispensing baffle within said chamber near said open bottom thereof.

2. The structure claimed in claim 1 wherein said means to support said chamber comprises an L-shaped stand support having a horizontal portion and a vertical portion, said rear wall of said chamber being mountable on the upper end of said vertical stand support portion with said chamber overlying and spaced upwardly from said stand support horizontal portion.

3. The structure claimed in claim 1 including a closure for said open bottom of said chamber, said closure being hingedly affixed to said chamber rear wall and swingable between a substantially horizontal closed position and a downwardly depending open position.

4. The structure claimed in claim 1 wherein said means to support said opened bottom end of said cone carton within said carton adapter comprises a substantially horizontal, inwardly extending stop lug on the inside surface of each of said four carton adapter walls, said stop lugs being substantially coplanar.

5. The structure claimed in claim 1 wherein said means on said carton adapter to support said dispensing baffle comprises a downwardly and outwardly extending flange on the lower edge of each of three of said four carton adapter walls, each of said flanges terminating in an inturned substantially horizontal portion, said horizontal portions being substantially coplanar, said dispensing baffle being removably supported on said inturned horizontal portions.

6. The structure claimed in claim 1 wherein said dispensing baffle comprises an assembly of two coextensive metallic sheets and a coextensive sheet of resilient material therebetween, said metallic sheets having corresponding openings formed therein equal in number to the number of cone columns in said cone carton and positioned to underlie said cone columns when said dispenser and said cone carton are fully assembled, the portion of said resilient sheet exposed by each of said corresponding openings in said metallic sheets having one of said cutouts formed therein, each of said cutouts being provided with a diameter greater than that of a cone to be dispensed therethrough and with radially inwardly extending fingers of said resilient sheet terminating short of the center of said cutout.

7. The structure claimed in claim 2 including a substantially planar crumb tray removably mounted of said horizontal portion of said stand support, said crumb tray having upturned edges.

8. The structure claimed in claim 6 wherein said resilient sheet material comprises food grade washable rubber having a durometer of from substantially 55 to substantially 65 and preferably about 60, and having a thickness of about 1/16 inch.

9. The structure claimed in claim 6 wherein said means to support said chamber comprises an L-shaped stand support having a horizontal portion and a vertical portion, said rear wall of said chamber being mountable on the upper end of said vertical stand support portion with said chamber overlying and spaced upwardly from said stand, support horizontal portion.

10. The structure claimed in claim 8 wherein said metallic sheets comprise 0.015 inch thick anodized aluminum.

11. The structure claimed in claim 9 wherein said means to support said carton adapter within said chamber comprises a hook-shaped flange at the upper edge of each of said four walls of said carton adapter extending upwardly and outwardly therefrom, each of said flanges being so sized and configured as to have a hook-like engagement with the upper edge of one of said chamber walls when said carton adapter is located within said chamber to suspend said carton adapter within said chamber.

12. The structure claimed in claim 11 wherein said means on said carton adapter to support said dispensing baffle comprises a downwardly and outwardly extending flange on the lower edge of each of three of said four carton adapter walls, each of said flanges terminating in an inturned substantially horizontal portion, said horizontal portions being substantially coplanar, said dispensing baffle being removably supported on said inturned horizontal portions.

13. The structure claimed in claim 12 wherein said means to support said opened bottom end of said cone carton within said carton adapter comprises a substantially horizontal, inwardly extending stop lug on the inside surface of each of said four carton adapter walls, said stop lugs being substantially coplanar.

14. The structure claimed in claim 13 including a substantially planar crumb tray removably mounted of said horizontal portion of said stand support, said crumb tray having upturned edges.

15. The structure claimed in claim 14 including a closure for said open bottom of said chamber, said closure being hingedly affixed to said chamber rear wall and swingable between a substantially horizontal closed position and a downwardly depending open position.

* * * * *